(No Model.)
W. A. ROGERS.
HAND TRUCK.
No. 432,566. Patented July 22, 1890.
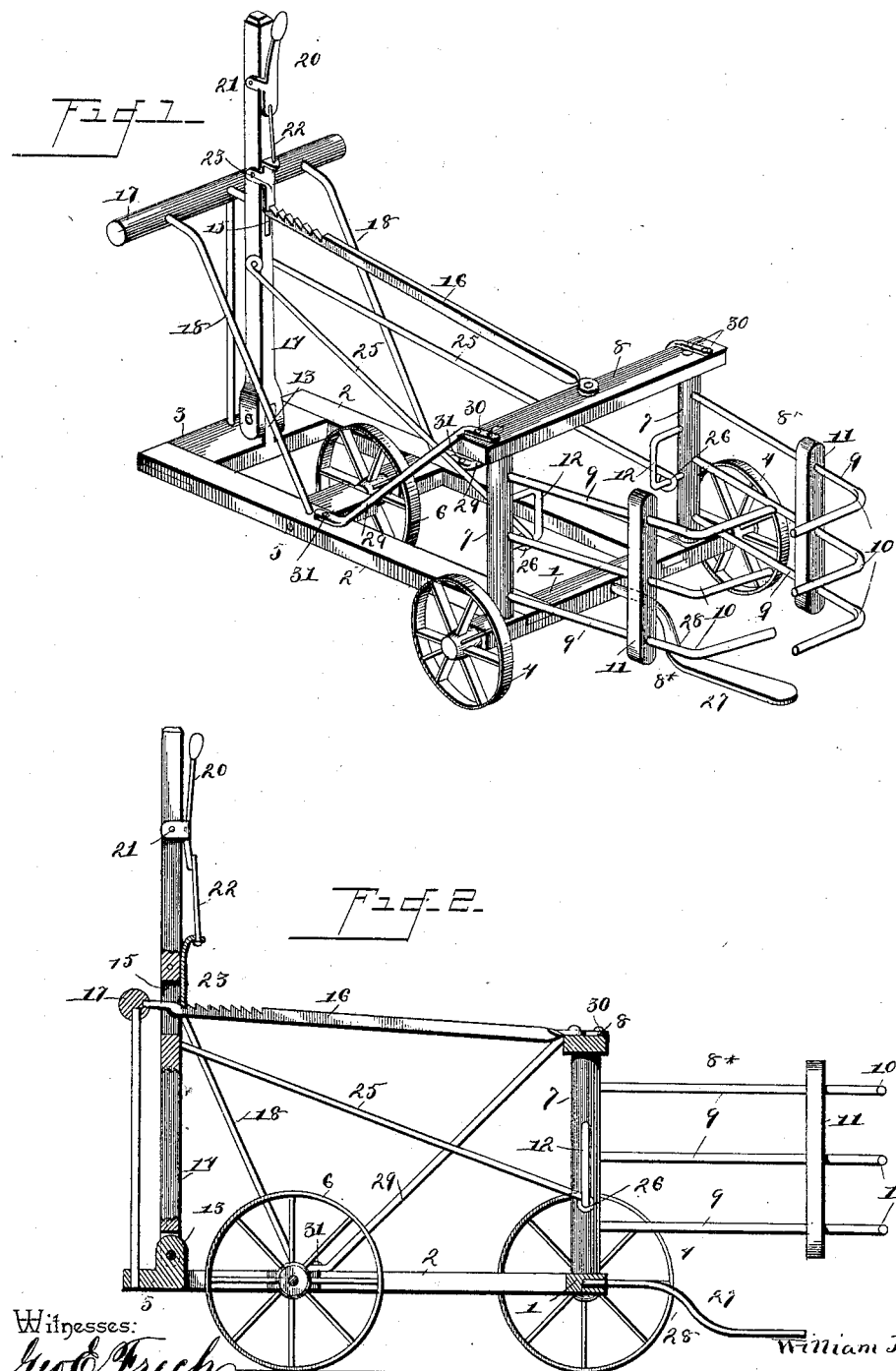
Witnesses:
Geo. E. Frick.
W. T. Duvall
Inventor
William A. Rogers.
By his Attorneys.
C. A. Snow & Co.

UNITED STATES PATENT OFFICE.

WILLIAM A. ROGERS, OF AMORET, MISSOURI.

HAND-TRUCK.

SPECIFICATION forming part of Letters Patent No. 432,566, dated July 22, 1890.

Application filed April 4, 1890. Serial No. 346,533. (No model.)

*To all whom it may concern:*

Be it known that I, WILLIAM A. ROGERS, a citizen of the United States, residing at Amoret, in the county of Bates and State of Missouri, have invented a new and useful Hand-Truck, of which the following is a specification.

This invention has relation to trucks for grasping and transporting boxes, barrels, bales, barbed-wire rolls, &c.

The objects and advantages of the invention, together with the novel features thereof, will hereinafter appear, and be particularly pointed out in the claims.

Referring to the drawings, Figure 1 is a perspective of a truck constructed in accordance with my invention. Fig. 2 is a longitudinal vertical section.

Like numerals of reference indicate like parts in both the figures.

The bed of the truck consists of a transverse axle 1, which connects the two adjacent ends of a pair of parallel side bars 2, connected at their opposite ends by a transverse bar 3. Upon the opposite ends of the axles are mounted wheels 4, and in bearings 5, formed in the side bars 2, there is mounted intermediate said bars a third wheel 6. From the axle 1, outside of the side bars 2, there rise a pair of opposite standards 7, connected at their upper ends by a cross-bar 8. The standards 7 are pivotally mounted in the axle and the cross-bar and have projecting laterally therefrom opposite jaws 8*, which jaws are each composed of a series of metal rods 9, the outer extremities of which are inwardly bent, as at 10, and the rods are connected and maintained rigidly in relation to each other by opposite connecting-bars 11. From the pivotal standards 6 and at a right angle to the jaws of said standards there are mounted U-shaped brackets or staples 12. At the opposite end of the bed or frame there is located a bearing-lug 13, in which is pivoted a vertically-disposed lever 14, having a perforation 15 formed therein, through which passes a notched locking-bar 16, horizontally disposed, one end being secured to the transverse bar 8 and the rear end to a handle 17, which is supported by standards 18, rising from the side bars 2. A locking-lever 20 is pivoted, as at 21, to the upper end of the operating-lever, and is connected by a link 22 to a pivoted locking-pawl 23, the lower end of which is adapted to normally engage the notches of the locking-bar. The locking-pawl may be withdrawn from engagement with the notches by operating the locking-lever, as will be apparent, and thus the operating-lever oscillated back and forth, and through the medium of a pair of connecting-rods 25, the rear ends of which are connected with the operating-lever and the forward ends of which are loosely connected, as at 26, to the U-shaped brackets or staples upon the pivoted standards, the jaws may be swung in or out. From the axle there projects forwardly a flat supporting-bar 27, slightly bent, as at 28, at its front end, said bar being designed to be inserted under a bag, box, barrel, or roll of barbed wire while the grasping-jaws are open.

This being the construction, the operation is as follows: The truck is advanced toward an object such as enumerated, and the operator slightly raises the rear end thereof and forces the supporting arm or bar under the object. Previous to this, however, the operating-lever has been thrown forward so as to swing the jaws from each other, and they therefore pass around the object and by a reversal of the lever grasp the same, in which position they are locked by the locking-pawl of the lever engaging an adjacent notch of the locking-bar. When an article is in position in the truck, it will be apparent that the whole weight is entirely supported by the wheels, thus relieving the operator of the jar and weight, as in ordinary trucks. To release the article it is simply necessary to withdraw the locking-pawl from engagement with the notches of the locking-bar, throw the lever forward, and the jaws being opened it simply remains necessary to tilt the truck slightly, so that the object will partially rest upon the ground, and then withdraw the truck, so that the supporting arm or bar will take from under the same. In this manner extremely heavy and awkward articles—such as barrels, rolls of barbed wire, &c.—may be handled with all ease and facility. The standards 7 and their connecting cross-bar are braced by a pair of inclined brace-rods 29, the upper ends of which are bolted to the cross-bar, as at 30, and the lower ends of which are bolted, as at 31.

Having thus described my invention, what I claim is—

1. The combination, with the axle terminating in the bearings, the ground-wheels mounted thereon, the opposite longitudinal side bars connected at their opposite ends to the axle and having opposite bearings, a central wheel mounted on an axle between the side bars, which axle is journaled in the bearings, of a pair of pivoted standards mounted on the axle and connected at their upper ends by a cross-bar, curved jaws projecting from the standards, each consisting of a series of curved rods connected by a bar, a bearing-lug mounted at the opposite end of the bed, a pair of handle-standards projecting from the bed and supporting the handle, an operating-lever pivotally mounted in the lug and having an opening, a notched rod passing through the opening and connected at its ends to the handle and to the standard-connecting cross-bar, a pivoted pawl mounted on the lever and engaging the rod, a lever for operating the pawl connected to the same by a link and pivoted on the operating-lever, a pair of rods connected to the lower end of the lever and loosely to a pair of brackets extending from the pivoted standards projecting at an angle to the jaws from said standards, and a supporting-arm projecting from the axle between the jaws, substantially as specified.

2. In a truck, the combination, with a pair of pivoted standards, means for operating the same, curved jaws extending from the standards, and a bed for supporting the same, of a forwardly-projecting flat depending supporting-arm extending from the bed between the jaws, substantially as specified.

In testimony that I claim the foregoing as my own I have hereto affixed my signature in presence of two witnesses.

WILLIAM A. ROGERS.

Witnesses:
PIERCE HACKETT,
JENNIE F. HACKETT.